United States Patent [19]

Brettle et al.

[11] 4,190,315
[45] Feb. 26, 1980

[54] LIGHT TRANSMISSION GUIDES

[75] Inventors: Jack Brettle, Nether Heyford; Norman F. Jackson, Duston, both of England

[73] Assignee: Plessey Handel und Investments A.G., Zug, Switzerland

[21] Appl. No.: 843,789

[22] Filed: Oct. 20, 1977

Related U.S. Application Data

[63] Continuation-in-part of Ser. No. 675,561, Apr. 9, 1976, abandoned.

[30] Foreign Application Priority Data

Apr. 10, 1975 [GB] United Kingdom ............... 14697/75

[51] Int. Cl.² ........................... G02B 5/14; C25D 5/00
[52] U.S. Cl. ............................... 350/96.12; 204/38 A; 204/58; 428/469
[58] Field of Search ............... 350/96.12, 96.13, 96.14; 204/38 A, 56 R, 58; 427/430 A, 430 B; 428/212, 469, 471, 472

[56] References Cited

U.S. PATENT DOCUMENTS

| 2,995,502 | 8/1961 | Ramirez et al. ........................ 204/58 |
| 3,820,871 | 6/1974 | Croset et al. ........................ 350/96.12 |

OTHER PUBLICATIONS

Hensler et al. "Optical Propagation in Sheet and Pattern Generated Films of $Ta_2O_5$" in *Applied Optics* vol. 10, No. 5, May 1971.
Lee et al. "Tantalum Oxide Light Guide on Lithium Tantalate" *Appl. Phys. Letts,* vol. 25, No. 3., Aug. 1974, pp. 164–166.
Ingrey et al. "Variable Refractive Index and Birefringent Waveguides by Sputtering Tantalum in $O_2$—$N_2$ Mixtures" *Applied Optics,* vol. 4, No. 9, Sep. 1975, pp. 2194–2198.

*Primary Examiner*—Stewart J. Levy
*Attorney, Agent, or Firm*—Fleit & Jacobson

[57] ABSTRACT

A light transmission guide comprising an anodic film of light transmitting material having a first anodised portion with a relatively high refractive index and at least a second portion with a relatively low refractive index, in which anodic film the increase in refractive index from said relatively high to said relatively low value is smooth and continuous in the vicinity of an interface between the first and second anodised portions, and in which the outer surface of said anodic film possesses a minimum amount of structural discontinuity on an atomic scale.

35 Claims, 13 Drawing Figures

LIGHT TRANSMISSION GUIDES

This application is a continuation-in-part of Ser. No. 675,561, filed Apr. 9, 1976, now abandoned.

This invention relates to the transmission of light, with particular reference to integrated optics.

In the art of integrated optics it is known to make electrical integrated circuit chips which include photoelectric devices, electro-optic devices, or both. The problem arises of transmitting light from one such device to another. Hitherto, when devices to be connected are on the same chip, the problem has been met by forming on the chip single or multilayer films of light transmitting materials. The layers are formed by conventional vacuum deposition processes. In some circumstances the surface of individual layers may be modified by thermal oxidation. In general light is transmitted in a layer of high refractive index material bounded by materials of lower refractive index. However, these light transmission guides have had only limited success, because of loss of light during transmission. Much of this loss is occasioned by irregularities in the change in value of refractive index at the interface of the layers. These irregularities are due to the physical unevenness of the interface which is inevitable when deposition processes are employed.

According to the invention there is provided a light transmission guide comprising an anodic film of light-transmitting material having a first portion with a relatively high refractive index and at least a second portion with a relatively low refractive index; in which anodic film the increase in refractive index from said relatively high to said relatively low value is smooth and continuous in the vicinity of an interface between said first and second anodised portions, and in which the outer surface of said anodic film possesses a minimum amount of structural discontinuity on an atomic scale.

Such guides may be prepared as part of an integrated optical chip and used to connect two devices on the chip. Alternatively, a guide may be prepared on a carrier and used to connect devices on different chips.

Preferably a light transmission guide, as described in the previous paragraph, is manufactured by an anodising operation in which a selected parent material is used as the anode. During the anodising operation, an anodic film of light-transmitting material is formed at the anode, which film has at least two portions of refractive indices of different values, the relationship between the said values being dependent on the nature and concentration of the electrolyte.

Embodiments of the invention will now be described by way of example only and with reference to the accompanying drawings, which are not to scale, and in which.

Figure 4:
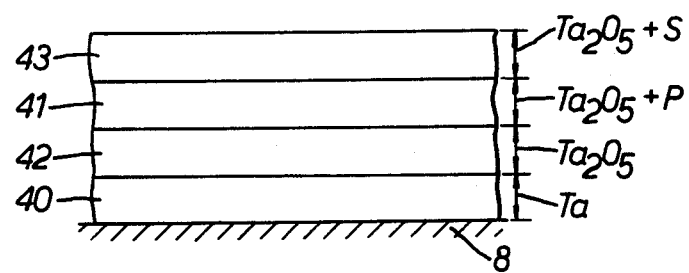
Figure 5:
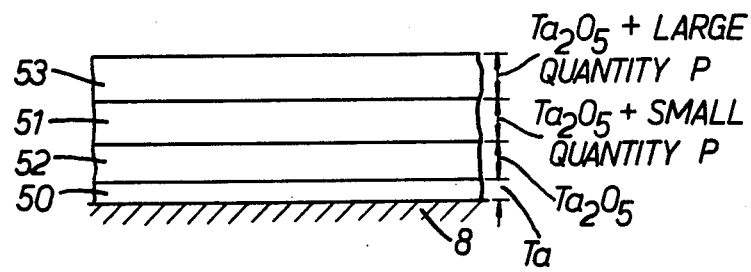
Figure 6A:
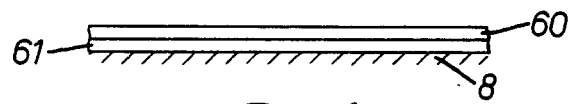
Figure 7:
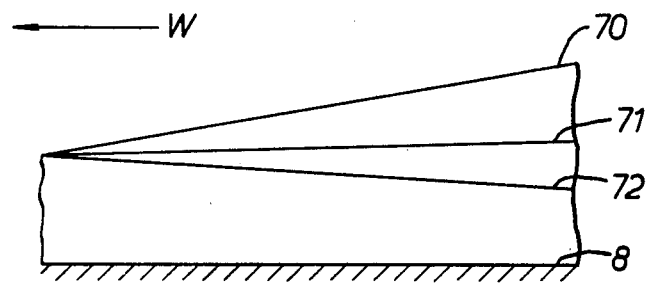

FIGS. 4, 5, 6a diagrammatically show sectional views of other forms of the guide according to the invention, and FIG. 7 shows a sectional diagram of a tapered guide according to the invention.

Figure 1A:
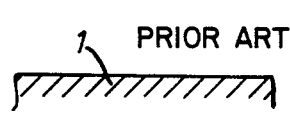
FIGS. 1a-1c are sectional diagrams showing stages in the manufacture of a known light transmission guide.
Figure 1B:
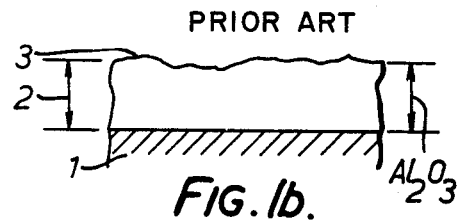
Figure 1C:
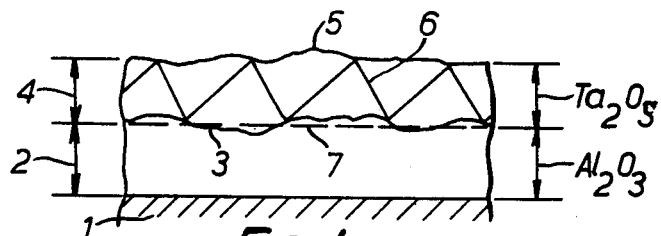
Figure 2A:
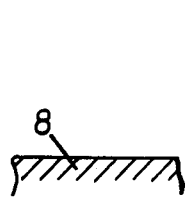
FIGS. 2a-2c are sectional diagrams showing stages in the manufacture of a light transmission guide according to the invention.
Figure 2B:
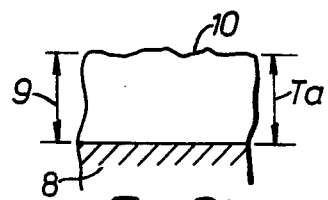
Figure 2C:
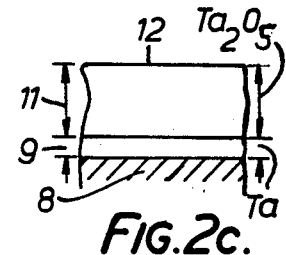
Figure 2D:
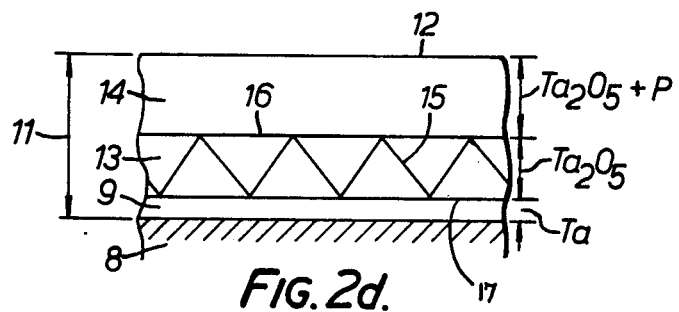
FIG. 2d shows FIG. 2c in greater detail.

As shown in FIGS. 1a-1c a known light transmission guide is formed by depositing, on a substrate 1, a lower layer 2 of light-transmitting material, for example aluminium oxide. Because a deposition process is employed, the upper surface of the layer 2 is microscopically uneven, as represented by the irregular line 3. An upper layer 4 of tantalum pentoxide is now deposited on the surface 3 of the lower layer 2. The upper layer 4 has an uneven upper surface 5. The upper layer 4 has a higher value of refractive index than the lower layer 2. The value of the refractive index of the upper layer 4 is also greater than that of ambient air, to which the surface 5 is exposed. Consequently the upper layer 4 can be used to transmit light by internal reflection, as indicated by the trace 6.

The transmission of light in the upper layer 4 is subject to appreciable loss. Much of this loss occurs at the surface 3. Ideally the surface 3 would be an even plane 7, and the refractive index would be the same at any point on the plane.

In a light transmission guide according to the invention, this ideal is much more closely approached. The closer approach is achieved by using anodising techniques in the manufacture of the guide. This will now be discussed with reference to FIGS. 2a-2d.

A guide according to the invention comprises a a substrate on to which a parent material is deposited. The parent material which forms the anode in an adosing operation then undergoes anodisation in a chosen electrolyte to form a light transmission guide.

Prior to anodisation occuring the parent material for example, tantalum, is deposited by conventional techniques, for example, vacuum deposition onto a major surface of the substrate 8. The tantalum forming a layer 9 which has a microscopically uneven upper surface 10. The substrate 8 comprises, for example a sheet of optically flat glass or a microelectronic circuit chip.

A compatible electrolyte for tantalum is aqueous phosphoric acid which will operate on the tantalum during anodisation to form an anodic film (11) of tantalum pentoxide which is light transmitting.

During anodisation growth of the layer 9 occurs by outward migration of tantalum ions (cations) i.e. from the layer 9 towards the tantalum electrolyte interface, and by the inward migration of oxygen ions (anions) i.e. from the electrolyte toward the substrate tantalum interface. Species, such as, for example, phosphorus are incorporated into an outer portion 14 of the anodic film 11.

Consequently the tantalum pentoxide anodic film 11 grown on and from the tantalum layer 9 comprises an outer portion 14 doped with phosphorus and an inner portion 13 of substantially pure tantalum pentoxide. The interface 16 between these portions being well defined, and parallel to the anodic film/electrolyte interface 12. Due to the presence of phosphorus in the outer portion 14 of the anodic film the refractive index of this portion will be substantially different from that of the inner portion 13 of tantalum pentoxide. As a general criterion the inner portion will have a higher refractive index than the outer portion of the anodic film. Thus due to this refractive index difference the anodic film acts as a light transmission guide.

The value of the refractive indices of the portions within the anodic film 11, and the thickness thereof vary in dependence upon the concentration of the electrolyte, the operating conditions of anodisation and the species which migrate into the outer layer of the anodic film from the electrolyte. In connection with this latter point for example, when phosphoric acid is used as electrolyte phosphorus species migrate into the outer portion, similarly if sulphuric acid was used sulphur species would migrate into the outer portion.

The anodic operation imparts a uniform structure to the anodic film 11 in the sense that there is no structural discontinuity such as exists in known guides also in respect of the preceding examples, interfaces 16 and 12 between electrolyte/outer portion and outer/inner portions of the anodic film as well as the interface 17 between the inner portion and the parent material are parallel on an atomic scale.

Owing to the parallel nature of these interfaces on an atomic scale when light is directed through the guide as shown by the trace 15 highly efficient internal reflection occurs as the physical unevenness of the interfaces has been eliminated.

Also if a series of 'in-phase' traces are directed through the guide they emerge in phase owing to the parallel nature of the interfaces.

An example of the typical conditions used to produce such a guide according to the invention are an electrolyte of an aqueous solution of 1 weight % of phosphoric acid. Anodising conditions of a constant current density of 0.1 mA/cm$^2$, with the voltage increasing to several hundred volts and the anodising temperature held at the ambient temperature of the laboratory. Under these conditions an anodic film of up to 1 micron thickness is produced.

Figure 3:
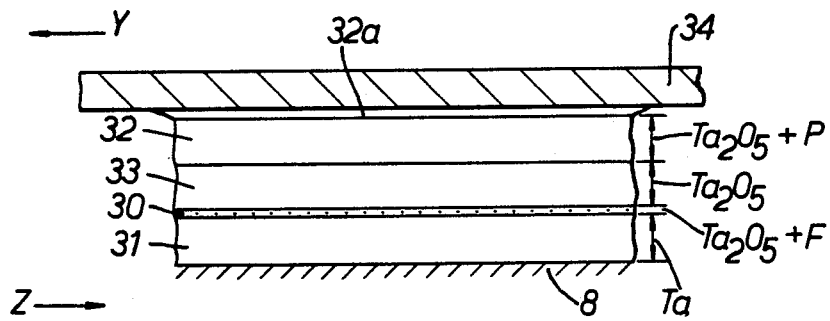
FIG. 3 shows a sectional diagram of a guide according to the invention, together with a carrier.

With reference to FIG. 3 if desired, the anodic film can be separated from the unanodised tantalum. The separation procedure can be achieved by first carrying out a relatively short anodising operation using a 1 weight % aqueous solution of sodium fluoride as the electrolyte at a constant current density of 0.1 mA/cm$^2$ up to a maximum voltage of 10 volts, the anodising temperature being maintained at the ambient temperature of the laboratory. This treatment results in the formation of a poorly adherent thin tantalum oxide portion 30 doped with fluorine species being formed on the outer portion of the tantalum layer 31.

A second relatively long anodising operation is then carried out using a 1 weight % aqueous solution of phosphoric acid at a constant current density of 0.1 mA/cm$^2$ and up to a maximum voltage of several hundred volts, the anodising temperature being maintained at the ambient temperature of the laboratory.

During this second anodisation operation growth of the tantalum layer 30 occurs by the migration process previously described. Migration of the tantalum ions occuring outward through the portion 30 doped with fluorine species and migration of the oxygen ions occuring inward as far as the portion 30 doped with fluorine species. The resultant anodic film comprising an outer portion 32 of tantalum pentoxide doped with phosphorus species and an inner portion 33 of substantially pure tantalum pentoxide. The portion 33 is sandwiched between the portions 30 and 32 and is of higher refractive index than the portion 32, such that these two portions 33 and 32 in combination form the light transmission guide. Removal of the anodic film from the unanodised layer 31 is then carried out by bonding a carrier 34 on to the upper surface 32a of the portion 32 by for example, an epoxy resin layer 35. After bonding opposing forces are applied, in the direction denoted by the arrows Y and Z., to the substrate 8 and the carrier 34 such that removal of the unanodised layer 31 is effected due to the presence of the poorly adherent portion 30.

Variation of an above described procedure can be used to prepare multi layer structure, these will now be described with reference to FIGS. 4 to 6 of the accompanying drawings.

With reference to FIG. 4 of the drawings, the multilayer guide diagrammatically illustrated therein comprises a substrate 8 onto which is deposited a layer of parent material for example tantalum. A first anodising operation is then carried out using for example an aqueous solution of phosphoric acid as electrolyte. During this first anodising operation, migration of ions occurs as previously described, such that an anodic film is formed having an outer portion 41 comprising tantalum pentoxide doped with phosphorus species and an inner portion 42 comprising substantially pure tantalum pentoxide, the portion 42 having a higher refractive index than the portion 41. A second anodisation operation is then carried out using a different electrolyte for example an aqueous solution of sulphuric acid. During the second anodisation operation a portion 43 will grow onto the portion 41, to form an addition to the anodic film, this portion 43 comprising tantalum oxide doped with sulphur species. The portions 41, 42 and 43 all have difference refractive indices, and thus any combination of parts can form a light transmission guide by having a light trace directed through them.

Additional portions can be grown by carrying out additional anodising operations in different electrolytes.

FIG. 5 diagrammatically illustrates another light transmission guide according to the invention which comprises a substrate 8 onto which a layer 50 of parent material for example tantalum is deposited. This layer 50 then forms the anode in a first anodising operation in which for example, a dilute aqeous solution of phosphoric acid is used for an electrolyte. During this anodisation operation growth of the layer 50 to form an anodic film occurs owing to migration of ions as previously described.

The anodic film includes an outer portion 51 comprising tantalum pentoxide doped with a relatively small quantity of phosphorus species, and an inner portion 52 comprising substantially pure tantalum pentoxide. The portion 52 having a higher refractive index than the portion 51.

A second anodising operation is then carried out using for example, a concentrated aqueous solution of phosphoric acid as the electrolyte. This results in the formation of an additional portion 53 which grows onto and from the portion 51. The portion 53 comprising tantalum pentoxide doped with a relatively large quantity of phosphorus species.

As the layers 51,32 and 53 all have different refractive indices as stated earlier with reference to FIG. 4 any combination of pairs of layers can be used as a light transmission guide.

Figure 6B:
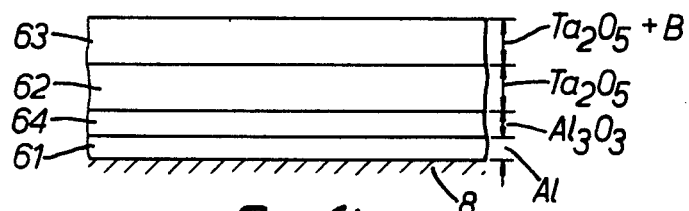

Another multilayer structure can be formed using a stratified electrode formed from two or more parent materials deposited onto a substrate 8. Thus the guide shown in FIGS. 6a and 6b is made by superimposing by for example, vacuum deposition a stratum 60, of one parent material, for example, tantalum onto a stratum 61 of another parent material, for example, aluminium. The layer 60 being thin enough to be totally converted to its oxide during anodisation.

An electrolyte is then chosen which is capable of converting both of the parent materials into light transmitting materials, a preferred electrolyte is 40 weight % ammonium pentaborate in 60 weight % glycol, the anodising conditions being a constant current density of 1.0 mA/cm$^2$ and the anodising temperature being the ambient temperature of the laboratory.

During anodisation the tantalum layer 60 is completely converted into an anodic film of tantalum pentoxide, two portions 62 and 63 being formed, the outer portion 63 comprising tantalum pentoxide doped with boron species and the inner portion 62 comprising substantially pure tantalum pentoxide. In addition the aluminum layer 61 is at least partially converted to its oxide to form part of the anodic film comprising portion 64. The portions 62, 63 and 64 each have different refractive indices. Any pairs of these portions are therefore capable of use as light transmission guides.

In all the foregoing examples the interfaces of the anodic films, i.e. electrolyte/anodic film interface and the interfaces between doped/non-doped portions, are parallel. In addition these interfaces are parallel to the unanodized parent material and substrate interfaces.

With reference to FIG. 7 of the drawings, a tapered guide may be formed in which the electrolyte/anodic film interface 70 and the non-doped/parent material interface 72 are inclined in respect to each other.

The tapering being achieved by slowly withdrawing the anode, in the direction denoted by the arrow W, from the electrolyte during anodisation.

Such a tapered film has three uses, firstly, it may be used to couple light into the film from the outside, secondly, it may couple light from one film into another film with an overlying taper and thirdly it may couple light from the film into the substrate. The third facility may be particularly useful where the substrate contains a solid state device such as a p-n junction detector into which is is desired to couple light.

In the foregoing example the anodic film covers the whole of the substrate. If only certain parts of the anodic film are required for light transmission, the surplus parts may be removed by etching. Alternatively anodic film formation may be restricted to the required areas using known masking techniques.

Parent materials for use as anodes during anodisation include tantalum, aluminium, niobium, titanium, tungsten, zirconium, hafnium, silicon, vanadium, and gallium and their alloys, and their compounds.

Suitable electrolytes for use in conjunction with these parent materials include:
Tantalum—Aqueous sulphuric acid, phosphoric acid, and ammonium, pentaborate in glycol.
Niobium—Aqueous phosphoric acid.
Aluminium—Aqueous boric acid in borax.
Titanium—Phosphoric acid in glycol-water mixture.
Tungsten—Aqueous sulphuric acid.
Zirconium—Aqueous sodium sulphate.
Hafnium—Aqueous sodium sulphate.
Silicon—Boric acid and ammonia dissolved in glycol.
Vanadium—Anhydrous acetic acid saturated with borax.
Gallium—Ammonium tartrate in glycol-water mixture.

What is claimed is:

1. A light transmission guide comprising an anodic film of light transmitting material having a first anodised portion with a relatively high refractive index and at least a second portion with a relatively low refractive index, in which anodic film the increase in refractive index from said relatively high to said relatively low value is smooth and continuous in the vicinity of an interface between said first and second anodised portions, and in which the outer surface of said anodic film possesses a minimum amount of structural discontinuity on an atomic scale.

2. A light transmission guide as claimed in claim 1 wherein the anodic film is formed from tantalum pentoxide.

3. A light transmission guide as claimed in claim 2 wherein the anodic film of tantalum oxide comprises a first anodised portion of substantially pure tantalum pentoxide and a second anodised portion of doped tantalum pentoxide.

4. A light transmission guide as claimed in claim 3 wherein the second anodised portion is doped with species from the anodising electrolyte.

5. A light transmission guide as claimed in claim 4 wherein the anodising electrolyte is aqueous phosphoric acid.

6. A light transmission guide as claimed in claim 3 wherein the anodic film includes a third anodised portion which is doped with a different species to that of the second anodised portion.

7. A light transmission guide as claimed in claim 3 wherein the anodic film includes a third anodised portion which is doped with the same species as the second anodised portion, said second and third anodised portions containing substantially different quantities of said species.

8. A light transmission guide as claimed in claim 1 wherein the anodic film is formed from first and second anodised portions containing tantalum pentoxide and a third anodised portion containing aluminum oxide, said second anodised portion being doped with species from an anodising electrolyte.

9. A light transmission guide as claimed in claim 8 wherein the anodising electrolyte is 40 weight % ammonium pentoborate in 60 weight % glycol.

10. A light transmission guide as claimed in claim 1 wherein the anodic film is formed from first and second anodised portions and wherein the electrolyte/anodic film interface and the first anodised portion/parent material interface of said guide are inclined with respect to each other, such that a tapered light transmission guide is formed.

11. A method of producing a light transmission guide which includes the steps of providing a substrate; depositing a parent material on a major surface of said substrate, the parent material and associated substrate forming the anode in an anodising operation; placing the parent material and associated substrate in an electrolyte which is capable of forming from the parent material, during the anodising operation, an anodic film of light transmitting material; and carrying out the anodising operation such that the anodic film so formed comprises a first anodised portion of relatively high refractive index and a second portion of relatively low refractive index wherein said first anodised portion is formed from substantially pure anodised parent material and said second anodised portion is formed from anodised parent material doped with anion species from said anodising electrolyte.

12. A method of producing a light transmission guide as claimed in claim 11 wherein the parent material is tantalum.

13. A method of producing a light transmission guide as claimed in claim 11 wherein the electrolyte is a 1 weight % aqueous solution of phosphoric acid.

14. A method of producing a light transmission guide as claimed in claim 11 wherein the anodic film comprises tantalum pentoxide.

15. A method of producing a light transmission guide as claimed in claim 11 wherein the first anodised portion of the anodic film comprises substantially pure tantalum pentoxide, and wherein the second anodised portion comprises tantalum pentoxide doped with phosphorus species.

16. A method of producing a light transmission guide as claimed in claim 11 wherein the anodising operation is carried out at a constant current density of 0.1 mA/cm$^2$ with voltage rising to several hundred volts and the anodising temperature being the ambient temperature of the laboratory.

17. A method of producing a light transmission guide as claimed in claim 11 wherein a carrier is bonded on to the second anodised portion of the anodic film on that surface thereof which is opposite to said substrate and wherein the anodic film is separated from the unanodised parent material.

18. A method of producing a light transmission guide as claimed in claim 17 wherein separation of the anodic film from the unanodised parent material is effected by a process which includes the steps of carrying out a first relatively short anodising operation in which an electrolyte is used which forms a doped oxide which is poorly adherent to the unanodised parent material, carrying out a second relatively long anodising operation to provide said anodic film, bonding a carrier to that surface of said anodic film which is opposite to the substrate, and applying opposing forces to the carrier and the substrate such that separation is effected.

19. A method of producing a light transmission guide as claimed in claim 18 wherein the electrolyte used during the first anodising operation is a 1 weight % aqueous solution of sodium fluoride, and wherein the first anodising operation is carried out at a constant current density of 0.1 mA/cm$^2$ with voltage rising to not greater than 10 volts and at the ambient temperature of the laboratory.

20. A method of producing a light transmission guide as claimed in claim 17 wherein the second anodising operation uses a 1 weight % aqueous solution of phosphoric acid as the electrolyte and wherein the second anodising operation is carried out at a constant current density of 0.1 mA/cm$^2$ rising to several hundred volts and at the ambient temperature of the laboratory.

21. A method of producing a light transmission guide which includes the steps of providing a substrate; depositing a parent material onto a major surface of the substrate; carrying out a first anodising operation using a first electrolyte such that an anodic film is formed; and carrying out a second anodising operation using an electrolyte which is different to that of the first electrolyte, such that an additional anodised portion is added to the anodic film.

22. A method of producing a light transmission guide as claimed in claim 21 wherein the parent material is tantalum.

23. A method of producing a light transmission guide as claimed in claim 22 wherein the first electrolyte is aqueous phosphoric acid.

24. A method of producing a light transmission guide as claimed in claim 23 wherein the electrolyte used for the second anodising operation is aqueous sulphuric acid.

25. A method of producing a light transmission guide which includes the steps of providing a substrate; depositing a parent material on to a major surface of said substrate; carrying out a first anodising operation using a dilute solution of an electrolyte such that an anodic film is formed, and carrying out a second anodising operation using a concentrated solution of the same electrolyte such that an addition is made to the anodic film.

26. A method of producing an anodic film as claimed in claim 25 wherein the parent material is tantalum and the electrolyte is phosphoric acid.

27. A method of producing a light transmission guide which includes the steps of providing a substrate; superimposing a stratum of a first parent material onto a stratum of a second parent material which is superimposed upon a major surface of the substrate; and carrying out an anodising operation which effects convertion of all of the first parent material and at least a portion of the second parent material into light transmitting materials, such that an anodic film comprising a first anodised portion of substantially pure anodised first parent material, a second anodised portion of doped anodised first parent material, and a third anodised portion of substantially pure anodised second parent material is formed.

28. A method of producing a light transmission guide as claimed in claim 27 wherein the first parent material is tantalum, and the second parent material is aluminium.

29. A method of producing a light transmittion guide as claimed in claim 27 wherein the anodising operation uses 40 weight % of ammonium pentaborate in 60 weight % glycol as an electrolyte.

30. A method of producing a light transmission guide as claimed in claim 27 wherein the anodising operation is carried out at a constant current density of 1.0 mA/cm$^2$ and at the ambient temperature of the laboratory.

31. A method of producing a light transmission guide wherein a parent material and its associated substrate are gradually withdrawn from an electrolyte during an anodising operation such that an anodic film having a tapered section is formed.

32. A method of producing a light transmission guide as claimed in claim 11 wherein the substrate is optically flat glass.

33. A method of producing a light transmission guide as claimed in claim 11 wherein the substrate is a microelectronic circuit chip.

34. A method of producing a light transmission guide as claimed in claim 11 wherein the parent material is selected from a group which includes tantalum, niobium, aluminum, titanium, tungsten, zirconium, hafnium, silicon, vanadium, gallium and their alloys, and their compounds.

35. A method of producing a light transmission guide as claimed in claim 11 wherein the anodising electrolyte is selected from a group which includes aqueous phosphoric acid, aqueous sulphuric acid, aqueous boric acid/borax, phosphoric acid in glycol/water mixture, aqueous sodium sulphate, boric acid and ammonia in glycol, anhydrous acetic acid saturated with borax, and ammonium tartrate in glycol/water mixture.

* * * * *